(12) United States Patent
Park

(10) Patent No.: US 7,609,961 B2
(45) Date of Patent: Oct. 27, 2009

(54) VEHICLE CAMERA

(76) Inventor: Eric S. Park, 10200 Pioneer Blvd., Suite 100, Sante Fe Springs, CA (US) 90670

( * ) Notice: Subject to any disclaimer, the term of this patent is extended or adjusted under 35 U.S.C. 154(b) by 500 days.

(21) Appl. No.: 11/401,405

(22) Filed: Apr. 11, 2006

(65) Prior Publication Data

US 2007/0237517 A1    Oct. 11, 2007

(51) Int. Cl.
*G03B 29/00* (2006.01)
*G03B 17/00* (2006.01)
*H04N 7/18* (2006.01)
*H04N 5/225* (2006.01)

(52) U.S. Cl. .................. 396/429; 396/427; 396/535; 348/148; 348/373

(58) Field of Classification Search .............. 396/427, 396/419, 424, 429, 535; 348/148, 373, 374
See application file for complete search history.

(56) References Cited

U.S. PATENT DOCUMENTS

| 3,349,679 | A * | 10/1967 | Lohman, III ............... 396/427 |
| 6,476,856 | B1 * | 11/2002 | Zantos ....................... 348/151 |
| 2004/0145457 | A1 * | 7/2004 | Schofield et al. ......... 340/425.5 |

* cited by examiner

*Primary Examiner*—Rochelle-Ann J Blackman
(74) *Attorney, Agent, or Firm*—Holland & Knight LLP

(57) ABSTRACT

A vehicle camera includes a vehicle lens having an opening, a camera body within the vehicle lens having a viewing axis through the opening, a base attached to the vehicle lens, wherein the viewing axis is at an angle between about 15 to 75 degrees with respect to a plane of the base.

23 Claims, 5 Drawing Sheets

VEHICLE CAMERA

BACKGROUND OF THE INVENTION

1. Field of The Invention

The present invention relates to a camera, and more particularly, to a camera mounted on a vehicle. Although the present invention is suitable for a wide scope of applications, it is particularly suitable for retrofitting a camera onto a vehicle.

2. Discussion of The Related Art

In general, cameras are mounted on vehicles so that a driver can see in blind spots of the vehicle on a monitor. A blind spot of a vehicle is an area near the vehicle that the driver can not readily see. Some blind spots are alleviated by the use of mirrors. However, some blind spots can only be monitored through the use of convex mirrors. Because of the visual distortion of a convex mirror, objects may be hard to discern in the convex mirror. Further, the relative distance of an object is difficult to assess in a convex mirror.

A camera can be mounted on the rear of a vehicle so that the driver can see behind the vehicle while backing up the vehicle. Typically, larger vehicles, such as buses and recreational vehicles have blind spots at the sides of the vehicle. Thus, a camera can be mounted on a side of a vehicle or rear part of the vehicle such that a driver can see in a blind spot at the side of the vehicle. The mounting of a camera is usually a retrofit or an add-on to a vehicle. In other words, the original styling of most vehicles does not include a built-in camera or a provision for an add-on camera.

FIG. 1 is an illustration of a related art vehicle camera on a side of a vehicle. As shown in FIG. 1, the related art vehicle camera 1 includes a camera body 10 mounted on a bracket 11 attached to the side of the vehicle 12. A housing 13 having window 14 for the camera body 10 is attached to the bracket 11 with bolts 15.

The relate art vehicle camera is obtrusive in appearance as compared to the original body style of the vehicle before the addition of the related art vehicle camera. Further, the related art vehicle camera blatantly has the appearance of being a camera such that theft of the related art vehicle camera is more probable. Furthermore, the related art vehicle camera requires drilling a hole in the vehicle or otherwise creating a mounting point on the vehicle.

SUMMARY OF THE INVENTION

Accordingly, the present invention is directed to a vehicle camera that substantially obviates one or more of the problems due to limitations and disadvantages of the related art.

An object of the present invention is to provide a vehicle camera that can be readily retrofitted to a vehicle.

Another object of the present invention is to provide a vehicle camera that is unobtrusive in appearance on a vehicle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the vehicle camera includes a vehicle lens having an opening, a camera body within the vehicle lens having a viewing axis through the opening, a base attached to the vehicle lens, wherein the viewing axis is at an angle between about 15 to 75 degrees with respect to a plane of the base.

In another aspect, the vehicle camera includes a vehicle lens for use as a vehicle light, a camera body within the vehicle lens having a viewing axis, and a base containing a wireless transmission circuit for wirelessly transmitting video signals to a receiver, the vehicle lens being attached to the base.

In another aspect, the vehicle camera includes a vehicle lens for use as a vehicle light, a camera body mounted completely within the vehicle lens, a transparent camera lens cover attached to the vehicle lens for protecting a camera lens within the camera body, and a base for mounting on a vehicle, the vehicle lens being attached to the base.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
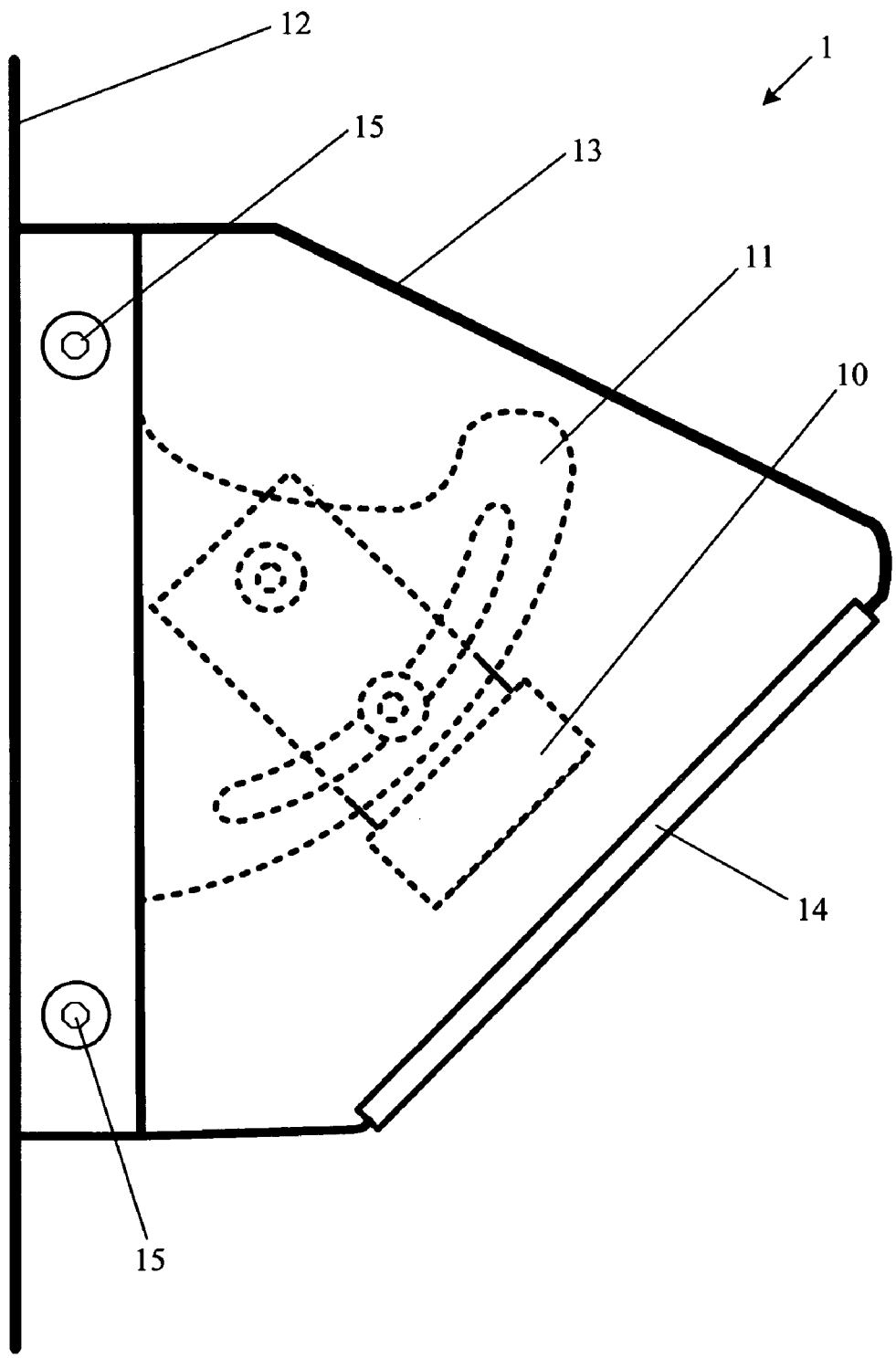
FIG. 1 is an illustration of a related art vehicle camera on a side of a vehicle.

Reference will now be made in detail to the preferred embodiments of the present invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions may be exaggerated for clarity. Like reference numerals in the drawings denote like elements.

Figure 2:
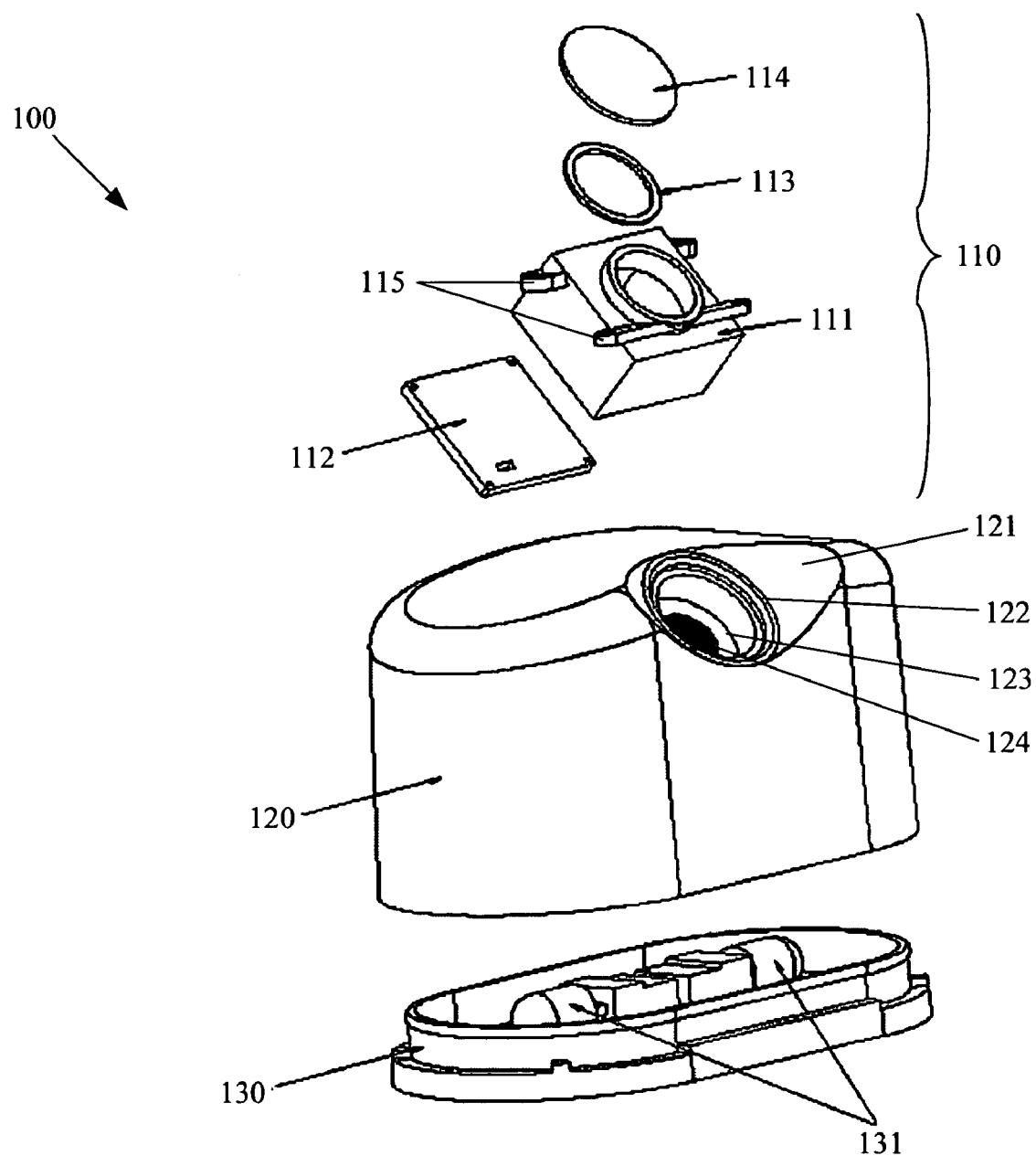
FIG. 2 is an exploded view of a vehicle camera according to a first embodiment of the present invention.

FIG. 2 is an exploded view of a vehicle camera according to a first embodiment of the present invention. FIG. 2 is an exemplary first embodiment of the invention implemented in 2"×4" type vehicle light. As shown in FIG. 2, a vehicle camera 100 includes a camera assembly 110 for mounting on a vehicle lens 120 that attaches to a base 130. The camera assembly 110 is attached within the vehicle lens 120. The base 130, which is either original equipment on the vehicle or a retrofit to the vehicle, is attached to the vehicle lens 120.

The camera assembly 110 of the vehicle camera 100 includes a camera body 111 with a camera body cover 112. The camera body 111 houses optoelectronic components (not shown) used to convert an optical image into electronic signals. The camera body cover 112 can allow access to the optoelectronic components. The camera body 111 also has mounting tabs 115 for directly attaching the camera body 111 to the interior surface of the vehicle lens 120. The camera assembly 110 also includes a gasket 113 for providing a water tight seal between the camera body 111 and the vehicle lens 120. The camera assembly 110 can also include a transparent camera lens cover 114 to protect the camera lens in the camera body 111.

The vehicle lens 120 can be any color that is used on vehicles as either a marker light, side light, brake light, tail light or reverse light. For example, the vehicle lens 120 can be yellow or ember for use as a side marker light, blue for use as a marker light, red for use as a tail light or white for use as a reverse light. The vehicle lens 120 can not only serve to emit a specific color but can also be a reflector by having an interior surface or surfaces of the vehicle lens 120 contoured to reflect ambient light as the specific color.

The exterior shape of the vehicle lens 120 is similar to a typical 2"×4" vehicle lens except for a concave portion 121 along a top edge that is opposite to a bottom edge, which is adjacent to the base 130 when the vehicle lens is attached to the base 130. The concave portion 121 includes a first recess 122 for mounting the camera lens cover 114 on the outside of the vehicle lens 120 and a second recess 123 for receiving the camera body 111 from the inside of the vehicle lens 120. More specifically, the second recess 123 has an opening 124 within which the camera body is positioned such that the viewing axis of the camera body 111 goes through the opening 124.

The second recess 123 of the concave portion 121 can be oriented such that the viewing axis of the camera body 111 is at about a 45 degree angle with respect to the plane of the base 130. Other viewing axes can be obtained by forming the vehicle lens to have a concave portion 121 with a second recess at other angles with respect to the plane of the base 130. For example, a kit for mounting a vehicle camera could come with a base 130, a camera assembly 110, and an assortment of 15 degree, 30 degree, 45 degree, 60 degree and 75 degree vehicle lenses such that a user can choose the appropriate viewing axis for a particular application. However, there are some applications when a viewing angle of about 90 degrees is appropriate. When a viewing angle of about 90 degrees is desired, the first recess 122 and second recess 123 are formed in the top surface of the vehicle lens 220 that is parallel to the plane of the base 230.

The base 130 is for mounting onto the vehicle 140 and for holding light bulbs 131, which provide light in response to power provided by the wiring 132. Although FIG. 2 shows two light bulbs 131, the base 130 can be configured to hold one light bulb, three light bulbs or more than three light bulbs. A light bulb can be incandescent or a light emitting diode. As mentioned above, the base 130 can either be original equipment or a retrofit. Thus, a user can either mount a vehicle camera using an existing base of a vehicle light, use the base of the first embodiment by attaching the base of the first embodiment to a vehicle using the mounting holes in the vehicle for previous base of a vehicle light, or retrofit a base of the first embodiment for the purpose of mounting the vehicle camera. An existing base may have to be modified by drilling a hole through the base to pass through wires from a monitor (not shown) to the camera body 111. The base of the first embodiment may already have a hole for the wires from the monitor (not shown) that connect to the camera body but the base of the first embodiment may have to be mounted to the vehicle by providing a new mounting area on the vehicle or using a preexisting mounting area on the vehicle. If the base of the first embodiment base is provided on a new mounting area on the vehicle and if an additional vehicle light is desired, wiring may need to be provided to the bulbs of the base of the first embodiment.

Figure 3:
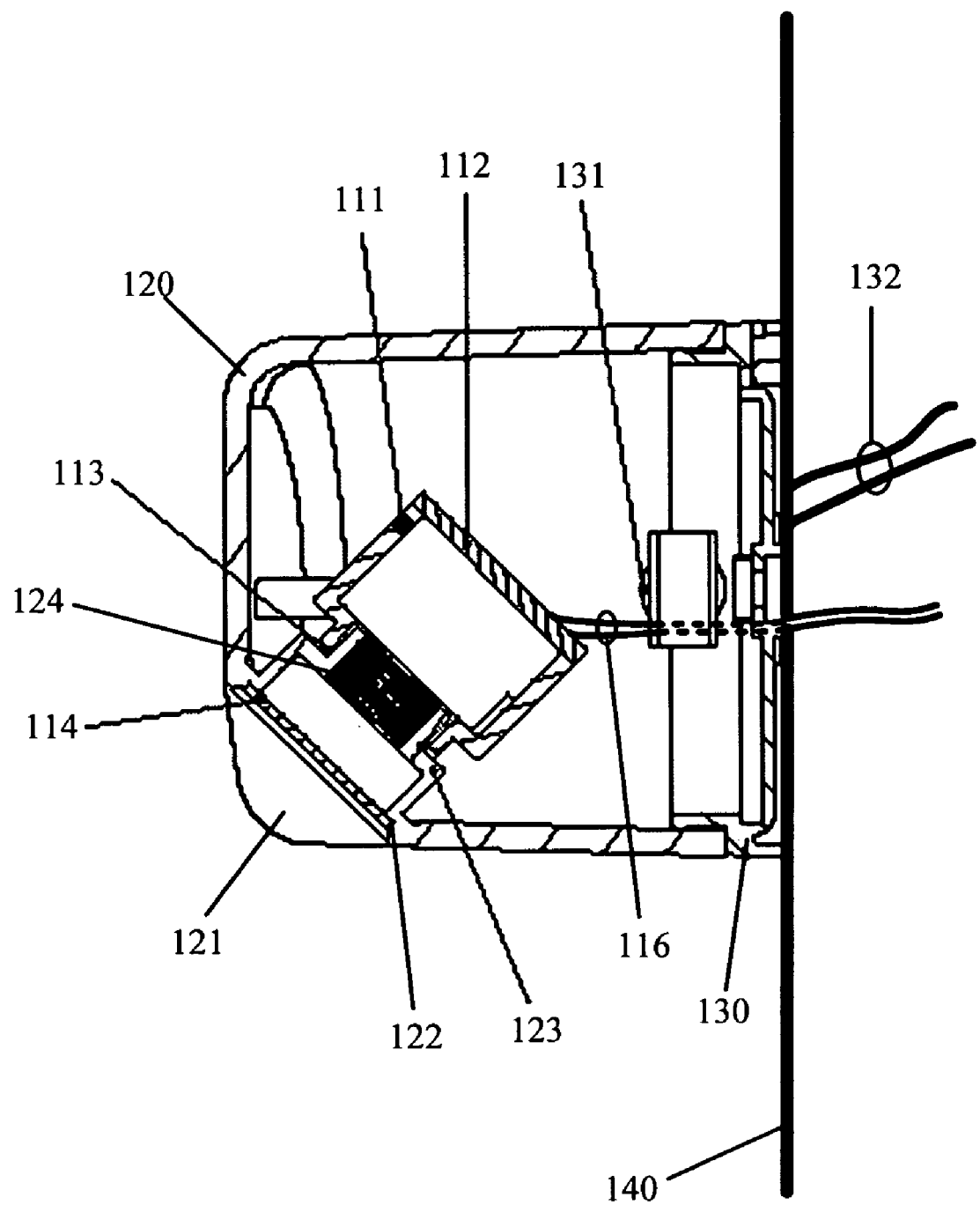
FIG. 3 is a cross-sectional view of the vehicle camera attached to the side of a vehicle according to a first embodiment of the present invention.

FIG. 3 is a cross-sectional view of the first embodiment of the vehicle camera attached to the side of vehicle according to a first embodiment of the present invention. As shown in FIG. 3, the camera body 111 of the vehicle camera 100 is attached to the vehicle lens 120 so as to be within an opening of the second recess 123 with the gasket 113 between the camera body 111 and the vehicle lens 120. The camera body 111 can be attached to the vehicle lens 120 by sliding the mounting tabs 115 into receptacles within the vehicle lens 120 and/or adhesively attaching the mounting tabs 115 to the vehicle lens 120. Wires 116 from the camera body 111 pass through the base 130. The camera lens cover 114 can be attached within the first recess 121 of the vehicle lens 120 with an adhesive.

As shown in FIG. 3, the camera body 111 is completely within the vehicle lens 120. No part of the camera is outside of the vehicle lens 120. Such a structure conceals the camera.

Figure 4:
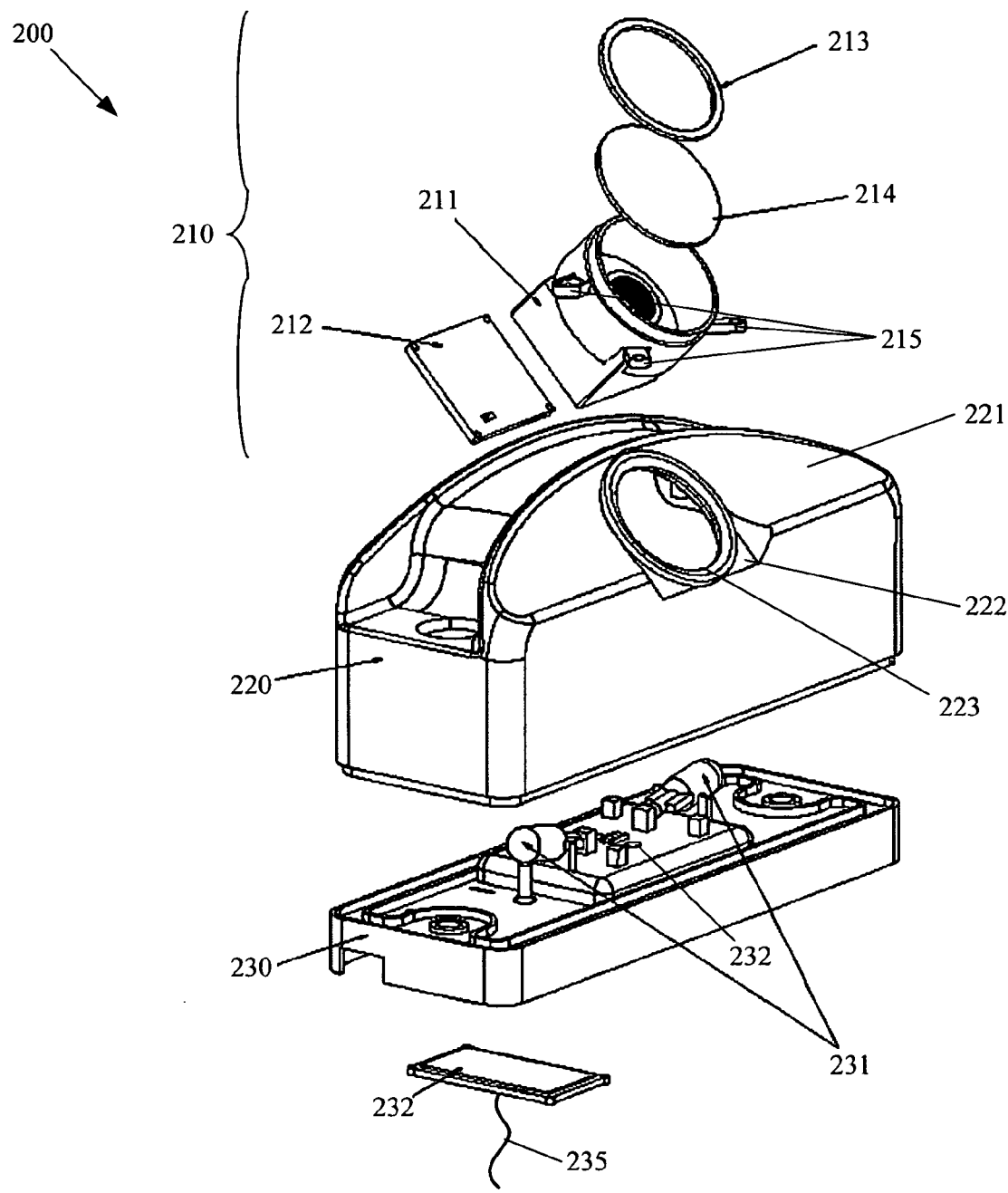
FIG. 4 is an exploded view of a vehicle camera according to a second embodiment of the present invention.

FIG. 4 is an exploded view of a vehicle camera according to a second embodiment of the present invention. FIG. 4 is an exemplary second embodiment of the invention implemented in 2"×6" type vehicle light. As shown in FIG. 4, a vehicle camera 100 includes a camera assembly 210 for mounting on a vehicle lens 220 that attaches to a base 230. The camera assembly 210 is attached within the vehicle lens 220. The base 230, which is either original equipment on the vehicle or is a retrofit to the vehicle, is attached to the vehicle lens 220.

The camera assembly 210 of the vehicle camera 200 includes a camera body 211 with a camera body cover 212. The camera body 211 houses optoelectronic components (not shown) used to convert an optical image into electronic signals. The camera body cover 212 can allow access to the optoelectronic components. The camera body 211 also has mounting tabs 215 for directly attaching the camera body 211 to the interior surface of the vehicle lens 220. The camera assembly 210 includes a transparent camera lens cover 214 to protect the camera lens in the camera body 211. The camera assembly 210 also includes a gasket 213 for providing a water tight seal between the camera lens cover 214 and the vehicle lens 220.

Similar to the vehicle lens 120 of the first embodiment, the vehicle lens 220 of the second embodiment can be any color that is used on vehicles as either a marker light, side light, brake light, tail light or reverse light. For example, the vehicle lens 220 can be yellow or ember for use as a side light, red for use as a tail light, blue for use as a marker light or white for use as a reverse light. The vehicle lens 220 can not only serve to emit a specific color but can also be a reflector by having an interior surface or surfaces of the vehicle lens 220 contoured to reflect ambient light as the specific color.

The exterior shape of the vehicle lens 220 is similar to a typical 2"×6" vehicle lens except for a slanted top surface 221 having concave portion 222 that can have the same inclination as the slanted top surface of the vehicle lens 220. In the alternative, the concave portion 221 can have a different inclination from the slanted top surface 221 of the vehicle lens 220. The concave portion 222 includes an opening 223 at which the camera lens cover 214 and the camera body 211 is attached at the inside of the vehicle lens 220. More specifically, the concave portion 222 has an opening 223 at which the camera body is positioned such that the viewing axis of the camera body 211 goes through the opening 223.

The concave portion 222 can be oriented such that the viewing axis of the camera body 211 is at about a 45 degree angle with respect to a plane of the base 230. Other viewing axes can be obtained by forming the vehicle lens to have a concave portion 222 at other angles with respect to the plane of the base 230. The concave portion can be at an angle similar to the top slanted surface of a typical 2"×6" vehicle lens or have an angle within a range of about 15 to 75 degrees with respect to the plane of the base 230. However, there are some applications when a viewing angle of about 90 degrees is appropriate. When a viewing angle of about 90 degrees is desired, the opening 223 is formed in the surface of the vehicle lens 220 that is parallel to the plane of the base 230.

The base 230 is for mounting onto the vehicle 240 and for holding light bulbs 231, which provide light. As discussed with regard to the previous embodiment, the base 230 can be configured to hold one light bulb, three light bulbs or more than three light bulbs. As discussed previously, the base 230 can either be original equipment or a retrofit. Further, the base 230 can contain a wireless transmission circuit 232 for wirelessly transmitting video signals received from the camera body 211. An external antenna 235 can extend from the wireless transmission circuit 232.

Figure 5:
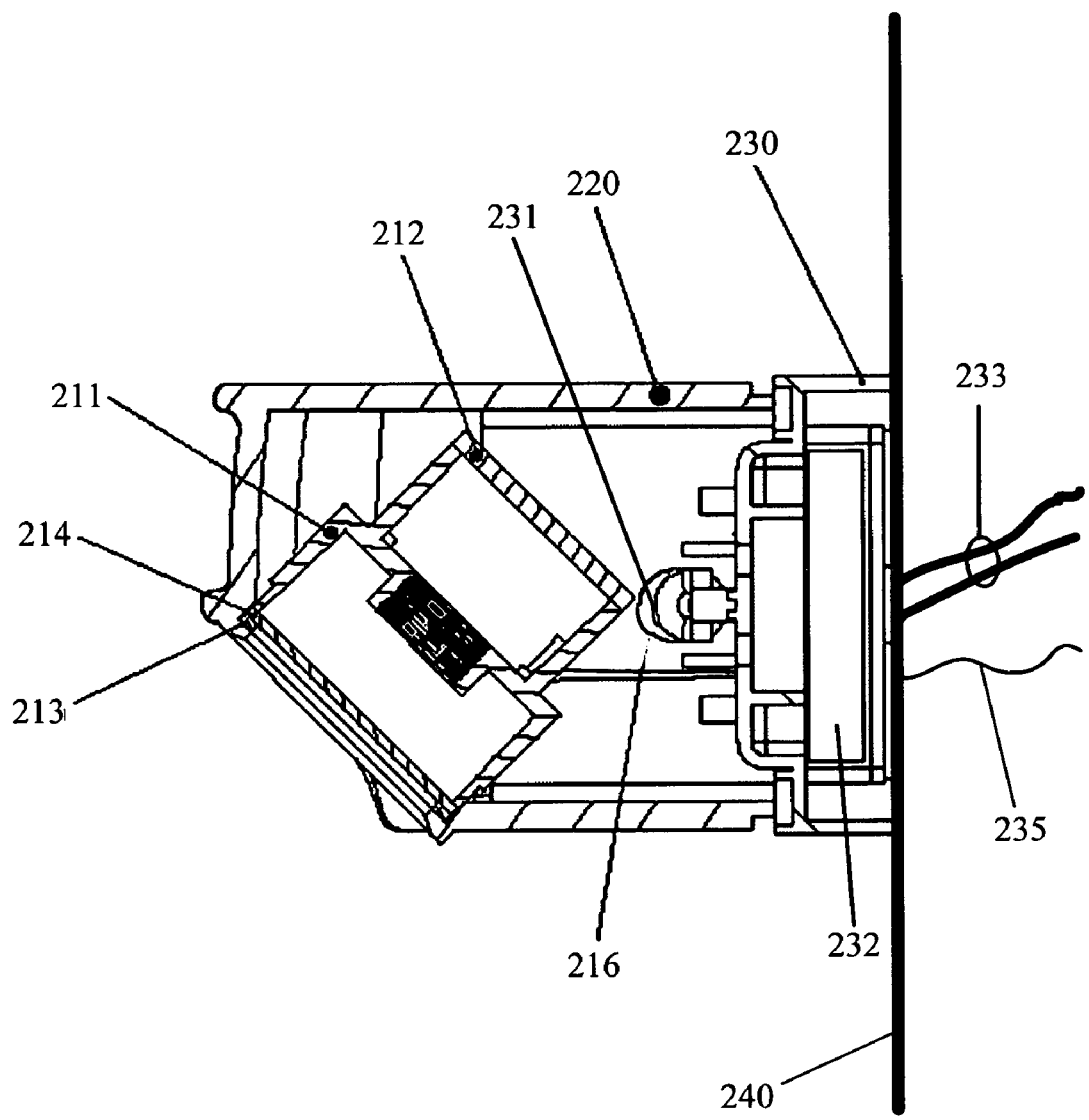
FIG. 5 is a cross-sectional view of the vehicle camera attached to the side of a vehicle according to a second embodiment of the present invention.

FIG. 5 is a cross-sectional view of the vehicle camera attached to the side of a vehicle according to a second embodiment of the present invention. As shown in FIG. 5, the camera body 211 of the vehicle camera 200 is attached within the vehicle lens 220 so that the gasket 213 is between the camera lens cover 214 and the vehicle lens 220. The camera body 211 can be attached to vehicle lens 220 by sliding the mounting tabs 215 into receptacles within the vehicle lens 220 and/or adhesively attaching the mounting tabs 215 to the vehicle lens 220. Wires 216 from the camera body 211 are connected to the wireless transmission circuit for wirelessly broadcasting video signals. A receiver (not shown) receives the wirelessly transmitting video signals and displays the video signals on a monitor (not shown) for a driver to see.

As shown in FIG. 5, the camera body 211 is completely within the vehicle lens 220. No part of the camera is outside of the vehicle lens 220. Such a structure conceals the camera.

As discussed previously, a user can either mount a vehicle camera using an existing base of a vehicle light, use the base of the second embodiment by attaching the base of the second embodiment to a vehicle using the mounting holes in the vehicle for previous base of a vehicle light, or retrofit a base of the second embodiment for the purpose of mounting the vehicle camera and, if desired, another vehicle light. An existing base may have to be modified by drilling a hole through the base to pass through wires from the wireless transmission circuit 232 to the camera body 211 and by hollowing out an area underneath the existing base. The base of the second embodiment will already have a hole for the wires from the wireless transmission circuit 232 as well as an area for the wireless transmission circuit 232 but the base of the second embodiment base will have to be mounted to the vehicle. The base of the second embodiment can be mounted on a new mounting area on the vehicle or use a preexisting mounting area on the vehicle.

Because the second embodiment uses a wireless transmission circuit 232, there is no need for further wiring between a monitor (not shown) and the vehicle camera 200. The optoelectronic components in the camera body 211 and the wireless transmission circuit 232 can receive power from the same wiring 233 that provides power to light bulbs 231 in the base 230. Thus, the wiring 233 used for the bulbs 231 can be used to provide power to the optoelectronic components in the camera body 211 and the wireless transmission circuit 232. In the alternative, power wiring can be provided for optoelectronic components in the camera body 211 that is separate from another set of power wiring provided for the wireless transmission circuit 232.

The camera in the camera body in embodiments of the present invention can be a wide angle camera or a regular aperture camera. The camera can be a color camera, or a black and white camera. In addition, the camera can include an infrared sensor for determining distance.

Embodiments of the present invention discussed above include a camera lens cover that is positioned over an opening in the vehicle lens of the present invention. However, embodiments of the present invention include a camera lens cover that is integrally formed with the vehicle lens. An integral camera lens cover in a vehicle lens is made by first forming the vehicle lens as a clear vehicle lens in the appropriate shape with the camera lens cover integral to the rest of the vehicle lens. Then, portions of the clear vehicle lens, other than the camera lens cover area, are selectively dyed the appropriate color by masking the camera lens cover are from the dyeing process. Accordingly, a vehicle lens can be made in which has a clear camera lens area and the rest of the vehicle lens is a desired color.

Embodiments of the present invention can be mounted on any side of a vehicle. For example, an embodiment of the present invention can be mounted on the side of a vehicle to see passing traffic. In another example, an embodiment of the present invention can be mounted high on the front of a vehicle to monitor objects in front of the vehicle below the hood line view of the driver. In yet another example, an embodiment of the present invention can be mounted on the roof of a vehicle with designated mounting brackets to monitor overhead objects.

It will be apparent to those skilled in the art that various modifications and variations can be made in the vehicle camera of the present invention without departing from the spirit or scope of the invention. Thus, it is intended that the present invention cover the modifications and variations of this invention provided they come within the scope of the appended claims and their equivalents.

What is claimed is:

1. A vehicle camera, comprising:
   a vehicle lens of an external light for a vehicle light, the vehicle lens having a translucent area of a predetermined color for allowing light transmission therethrough of the predetermined color and having an opening in the translucent area of the vehicle lens;
   a camera body within the vehicle lens having a viewing axis through the opening; and
   a base attached to the vehicle lens,
   wherein the viewing axis is at an angle between about 15 to 75 degrees with respect to a plane of the base.

2. The vehicle camera according to claim 1, wherein the base includes an incandescent for providing light.

3. The vehicle camera according to claim 1, wherein the base includes a light emitting diode for providing light.

4. The vehicle camera according to claim 1, further comprising a wireless transmission circuit in the base for wirelessly transmitting video signals to a receiver.

5. The vehicle camera according to claim 4, further comprising an external antenna extending from the wireless transmission circuit.

6. The vehicle camera according to claim 5, wherein optoelectronic components in the camera body and the wireless transmission circuit receive power from wiring that provides power to a light bulb in the base.

7. The vehicle camera according to claim 1, wherein the camera body includes an infrared sensor.

8. The vehicle camera according to claim 1, wherein the vehicle lens includes a concave portion having a first recess at the opening for mounting a camera lens cover on the outside of the vehicle lens and a second recess at the opening for receiving the camera body from the inside of the vehicle lens.

9. The vehicle camera according to claim 8, further comprising a gasket positioned between the camera body and the vehicle lens for providing a water tight seal.

10. The vehicle camera according to claim 1, wherein the vehicle lens includes a slanted top surface with a concave portion having an opening at which a camera lens cover and the camera body is attached at the inside of the vehicle lens.

11. The vehicle camera according to claim 10, further comprising a gasket positioned between the camera lens cover and the vehicle lens for providing a water tight seal.

12. A vehicle camera, comprising:
 a vehicle lens of an external light for a vehicle, the vehicle lens having a having a translucent area of a predetermined color for allowing light transmission therethrough of the predetermined color and having an opening in the translucent area of the vehicle lens;
 a camera body within the vehicle lens and at the opening such that camera body has a viewing axis through the opening; and
 a base containing a wireless transmission circuit for wirelessly transmitting video signals to a receiver,
 wherein the vehicle lens is being attached to the camera body.

13. The vehicle camera according to claim 12, wherein the viewing axis is at an angle between about 15 to 75 degrees with respect to a plane of the base.

14. The vehicle camera according to claim 12, further comprising an external antenna extending from the wireless transmission circuit.

15. The vehicle camera according to claim 12, wherein optoelectronic components in the camera body and the wireless transmission circuit receives power from wiring that provides power to a light bulb in the base.

16. A vehicle camera, comprising:
 a vehicle lens of an external light for a vehicle, the vehicle lens having a translucent area with an internal reflector surface and having an opening in the translucent area of the vehicle lens;
 a camera body mounted completely within the vehicle lens;
 a transparent camera lens cover attached to the vehicle lens at the opening for protecting a camera lens within the camera body; and
 a base for mounting on a vehicle, the vehicle lens being attached to the base.

17. The vehicle camera according to claim 16, wherein the base contains a wireless transmission circuit for wirelessly transmitting video signals to a receiver.

18. The vehicle camera according to claim 16, wherein optoelectronic components in the camera body and the wireless transmission circuit receive power from wiring that provides power to a light bulb in the base.

19. The vehicle camera according to claim 16, wherein the vehicle lens includes a concave portion having a first recess for mounting the transparent camera lens cover on the outside of the vehicle lens and a second recess with an opening for receiving the camera body from the inside of the vehicle lens.

20. The vehicle camera according to claim 19, further comprising a gasket positioned between the camera body and the vehicle lens for providing a water tight seal.

21. The vehicle camera according to claim 16, wherein the vehicle lens includes a slanted top surface with a concave portion having an opening at which the transparent camera lens cover and the camera body is attached at the inside of the vehicle lens.

22. The vehicle camera according to claim 21, further comprising a gasket positioned between the transparent camera lens cover and the vehicle lens for providing a water tight seal.

23. The vehicle camera according to claim 16, wherein the transparent camera lens cover is integrally formed with the vehicle lens.

\* \* \* \* \*